(12) United States Patent
Evans et al.

(10) Patent No.: US 8,310,356 B2
(45) Date of Patent: Nov. 13, 2012

(54) WIRELESS BRAKE ELECTRONIC WEAR SENSORS

(75) Inventors: Charles K. Evans, Willis, WI (US); Paul Castrilli, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 396 days.

(21) Appl. No.: 12/631,818

(22) Filed: Dec. 5, 2009

(65) Prior Publication Data

US 2011/0133923 A1     Jun. 9, 2011

(51) Int. Cl.
*G08B 21/00* (2006.01)
(52) U.S. Cl. .... 340/454; 340/453; 340/438; 188/1.11 R; 188/1.11 W; 192/30 W
(58) Field of Classification Search .................. 340/454; 188/1.11 R, 1.11 W; 192/30 W
See application file for complete search history.

(56) References Cited

U.S. PATENT DOCUMENTS

| | | | |
|---|---|---|---|
| 7,847,679 B2* | 12/2010 | Copeland et al. | 340/454 |
| 7,877,216 B2* | 1/2011 | Wright et al. | 702/34 |
| 2002/0116992 A1* | 8/2002 | Rickel | 73/146 |
| 2005/0035924 A1* | 2/2005 | Liu et al. | 343/895 |
| 2006/0042734 A1* | 3/2006 | Turner et al. | 152/154.2 |
| 2008/0190712 A1* | 8/2008 | Hagberg | 188/1.11 L |

* cited by examiner

*Primary Examiner* — Jennifer Mehmood
*Assistant Examiner* — Mark Rushing
(74) *Attorney, Agent, or Firm* — Joseph E. Root

(57) ABSTRACT

Devices and methods for sensing wear of a component are described. A wear-sensing device has a wear component and a wireless sensor disposed within the wear component. The sensor generates a signal, detectable by a detector, for confirming the presence of the sensor. Further, the claimed invention includes a positioner for precisely positioning the sensor within the wear component. Also, an authentication module is present for authenticating the sensor.

2 Claims, 3 Drawing Sheets

US 8,310,356 B2

WIRELESS BRAKE ELECTRONIC WEAR SENSORS

BACKGROUND OF THE INVENTION

The present application relates generally to sensors in vehicles, and more particularly, to devices for sensing wear of a vehicle component.

Wear components, such as tire tread and brake pads, are abraded by wearing surfaces, such as pavement and brake rotors. At some point, wear components are so worn that their continued use may be dangerous. Presently, government regulations require vehicle owners, particularly commercial operators of vehicles such as trucks, to inspect wear and remaining life of certain vehicle components, such as brake pads.

It would be particularly useful to be able to monitor brake pad wear during vehicle operation. Then, the operator would simply be notified when replacement is required. One method for on-the-fly brake pad wear detection employs clip-on acoustic devices, which can be noisy and disturbing to the driver and those around the vehicle. Further, the driver may not understand the audible signal produced by such acoustic devices or may ignore it. Other solutions, such as providing inspection openings in calipers (which weaken the caliper) also exist. These solutions, however, have proven to be complex and may also be expensive to implement.

Another solution places an electronic sensor within a vehicle component to monitor its condition. These sensors often require wires and connectors which may preclude their use altogether, and at least makes such installations cumbersome. Wireless sensor design for wear detection has been attempted, using multi-frequency transmitters. Such designs may further require multiple sensors, raising the cost of manufacture. Moreover, the position of the sensor system within the vehicle component can vary during manufacture and may shift during operation, preventing accurate assessment of the vehicle component's condition.

It would be highly desirable to have a relatively simple and cost effective system for vehicle component wear detection that also ensures improved estimation of the wear component's condition.

BRIEF DESCRIPTION OF THE INVENTION

One embodiment of the present application describes a wear-sensing device having a wear component and a wireless sensor disposed within the wear component. The sensor generates a signal, detectable by a detector, for confirming the presence of the sensor. The improvements this disclosure presents include a positioner for precisely positioning the sensor within the wear component. Further, the claimed invention includes an authentication module for authenticating the sensor.

Another embodiment of the present application discloses a method for sensing condition of a wear component. A sensor, configured to emit signals, including an authentication signal, is embedded within the wear component, employing a positioner. The method detects a signal from the sensor, verifying the sensor's presence. Further, the method authenticates the sensor based on the authentication signal.

DETAILED DESCRIPTION OF THE INVENTION

The following detailed description is made with reference to the figures. Exemplary embodiments are described to illustrate the subject matter of the disclosure, not to limit its scope, which is defined by the appended claims.

The drawings depict exemplary wear-sensing devices and methods according to some embodiments of the present disclosure. The wear-sensing devices can be used in various types of vehicles including small or large cars, trucks, vans, SUVs, and trailers. More particularly, the wear-sensing devices and methods may be used in relation with vehicle parts prone to wear, such as brake pads, tires, and similar components.

The exemplary embodiments of the disclosure are related to a sensor embedded within a vehicle component that experiences wear (referred to as 'wear component') from interaction with a friction surface. The sensor emits various types of signals, including a signal confirming its presence to a detector in the vehicle. At some point during the vehicle's operation, the sensor becomes exposed to the friction surface and is eventually destroyed. The vehicle detector ceases to receive the signal, indicating that the wear component is substantially worn and may require replacement or repair. Employment of this technology permits the sensor signal to be encoded to communicate a variety of useful information. For example, the signal can be particular to a given make or model of a vehicle, allowing the system to authenticate the wear component as a genuine product, warning the user that a non-branded component has been installed.

Figure 1:
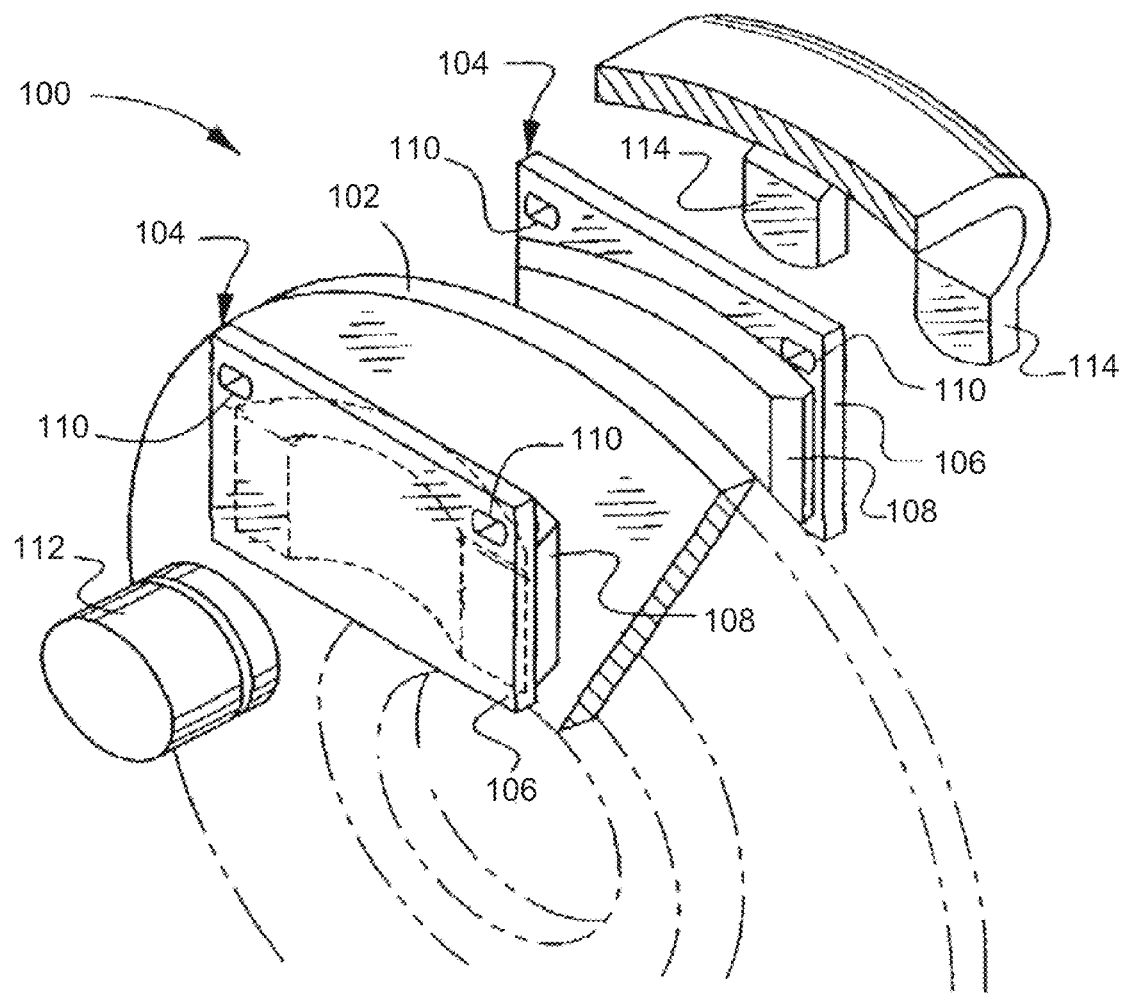
FIG. 1 is an exploded, isometric view of a conventional disc brake apparatus.

FIG. 1 is an exploded, isometric view of a conventional disc brake apparatus 100 and represents an exemplary environment within which the present disclosure can operate. The disc brake apparatus 100 includes a rotatable rotor 102 that rotates with the axle and includes two braking components 104. Each braking component 104 includes a shoe plate 106, preferably made of steel, and brake pads 108 mounted on the rotor 102 side of the shoe plate 106.

The two shoe plates 106 are suspended in a conventional caliper mounting structure (not shown) by, for example, rods that extend through openings 110 in the upper corners of the shoe plates 106. Such a caliper mounting permits the shoe plates 106 to move axially on the support rods.

The shoe plates 106 are moved inwardly toward one another under forces supplied by a hydraulically actuated piston 112 and the related caliper fingers 114. When the piston 112 and the caliper fingers 114 press the shoe plates 106 inwardly, the inner surfaces of the brake pads 108 are engaged in frictional, braking contact with the rotor 102. This engagement leads to subsequent wear of the brake pads 108. Although, FIG. 1 illustrates a conventional disc brake apparatus 100, the claimed invention may be employed in relation with any type of braking system.

Figure 2:
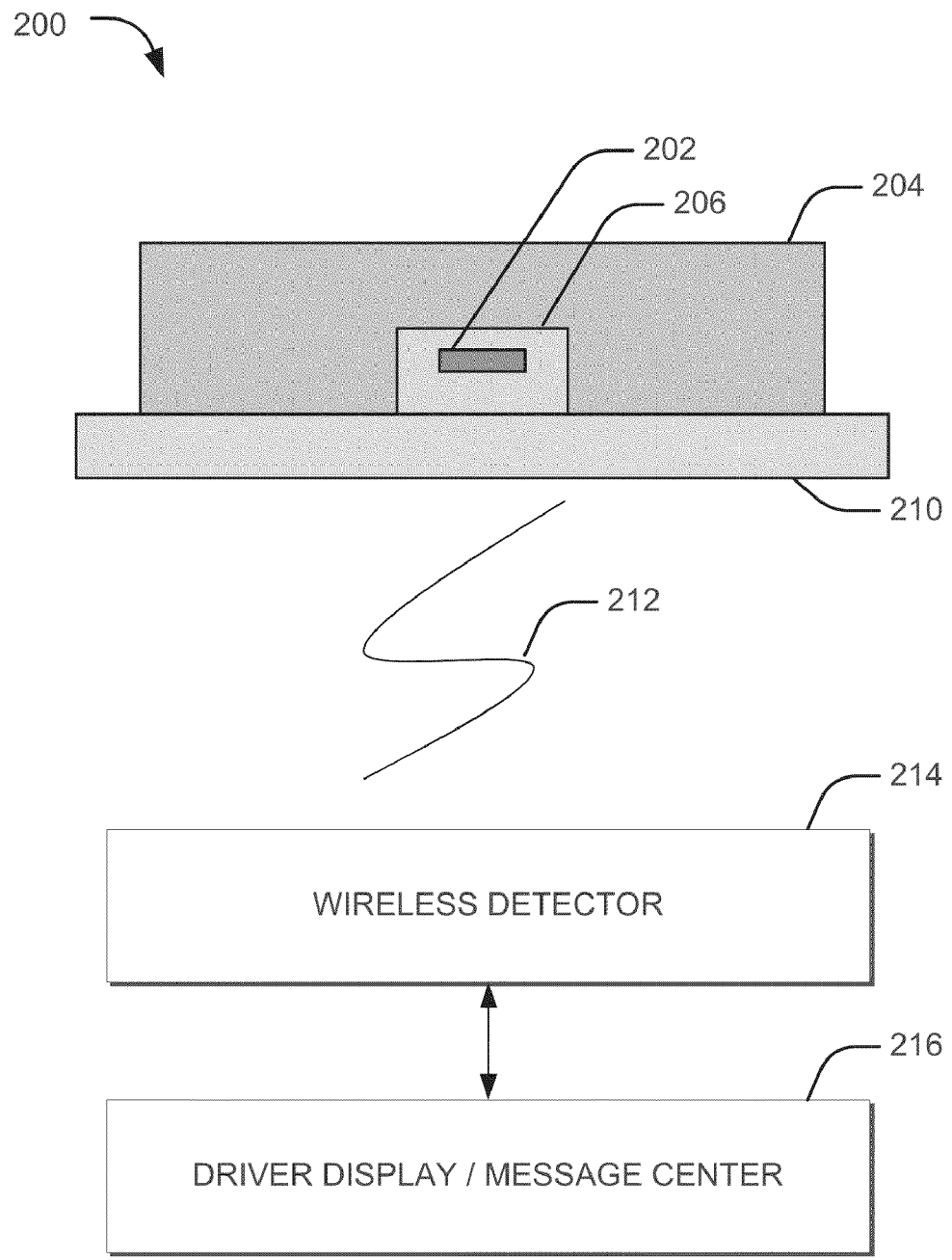
FIG. 2 illustrates an exemplary wear-sensing device.

FIG. 2 illustrates an exemplary wear-sensing device 200 including a wireless sensor 202 disposed within a wear component 204. In various embodiments, the sensor 202 can be a single code transmitter, capable of transmitting one specific message, making this design cost-effective as well as simple to implement, as opposed to more complicated multi-code devices, which are capable of transmitting multiple different messages or wear states. A positioner 206 precisely positions the sensor 202 within the wear component 204. FIG. 2 shows a vehicle surface 210, which may be a portion of a vehicle component, such as a portion of the brake-mounting apparatus on which the wear component 204 is present. The sensor 202 can generate various signals, including a wireless signal 212, detectable by a wireless detector 214 that confirms the presence of the sensor 202. An authentication module (not shown) is responsible for authenticating the sensor 202. In one embodiment, the authentication module lies in the sensor 202 and transmits an authentication signal or code, confirming to the driver that the wear component 204, installed on the vehicle, is an authentic product and not a part supplied by an unauthorized party, not certified to perform to expected performance and safety standards. FIG. 2 shows a driver display or message center 216, connected to the wireless detector 214, for providing status updates to the driver. The driver display or message center 216 can display messages relating to the absence or presence of the sensor 202, the status of wear of the wear component 204, authentication of the wear component 204, or other desired information.

In some embodiments, the sensor 202 is a radio frequency identification (RFID) tag. In other embodiments, the positioner 206 is a plug enclosing the sensor 202, allowing precise positioning of the sensor 202 within the wear component 204. The sensor 202 and positioner 206 combination can take a number of different forms; for example, the sensor 202 could be molded into the positioner 206, which in turn can be molded into the wear component 204 at a predetermined position. The precise position and design of the positioner 206 ensure that the destruction of the sensor 202 indicates the exact amount of wear sustained by the wear component 204 and the time remaining until the wear component 204 needs replacement or repair. For example, in case the wear component 204 is a brake pad, the positioner 206 may be designed such that the destruction of the sensor 202 indicates that the brake pad needs to be replaced or repaired immediately. Alternatively, the positioner 206 positions the sensor 202 such that, once the sensor 202 is destroyed, the brake pad may be replaced or repaired anytime before the vehicle drives another twenty miles. Further, the positioner 206 may be formed from a plastic material. It will be appreciated by a person skilled in the art that the positioner 206 may vary in shape, size, structure, material, and so on, without departing from the scope of the present disclosure, as long as it serves the purpose of providing precise positioning of the sensor 202 within the wear component 204 and facilitating the sensor's 202 destruction in a predictable manner. It will be clear to those skilled in the art that the positioner 206 enables the precise location of the sensor 202 such that the system will not indicate a need for replacing the wear component until a replacement is actually required. Without such a wear-sensing system, users could easily be replacing components with considerable remaining useful life.

Consider an exemplary embodiment where the wear component 204 is a brake pad, facing the brake rotor of a vehicle; the attached adjacent vehicle surface 210 is a metal shoe plate. Here, the sensor 202 is a radio frequency identification (RFID) tag, molded into the brake pad along with a positioner, which ensures precise positioning of the RFID tag. The RFID tag can generate a signal, confirming its presence to a detector in the vehicle and may further generate an authentication signal, authenticating the brake pad as an authentic component, as already described in relation with FIG. 2.

Most current vehicles already have RFID detectors that can read and detect RFID tags. Other vehicles generally have electronic detectors to monitor other parameters related to vehicle operation, such as tire pressure. Such detectors can also detect wireless signals that emanate from RFID tags. Many such detectors require only minor modifications to allow detection of RFID tags or other components such as the sensor 202. During operation, the brake pad wears, and at some point, the RFID tag makes contact with the rotor, destroying itself. Upon detecting the loss of the RFID tag, a processor in the vehicle informs the driver, through a display system, such as a display screen, that the vehicle's brake pads require replacement or repair.

Figure 3:
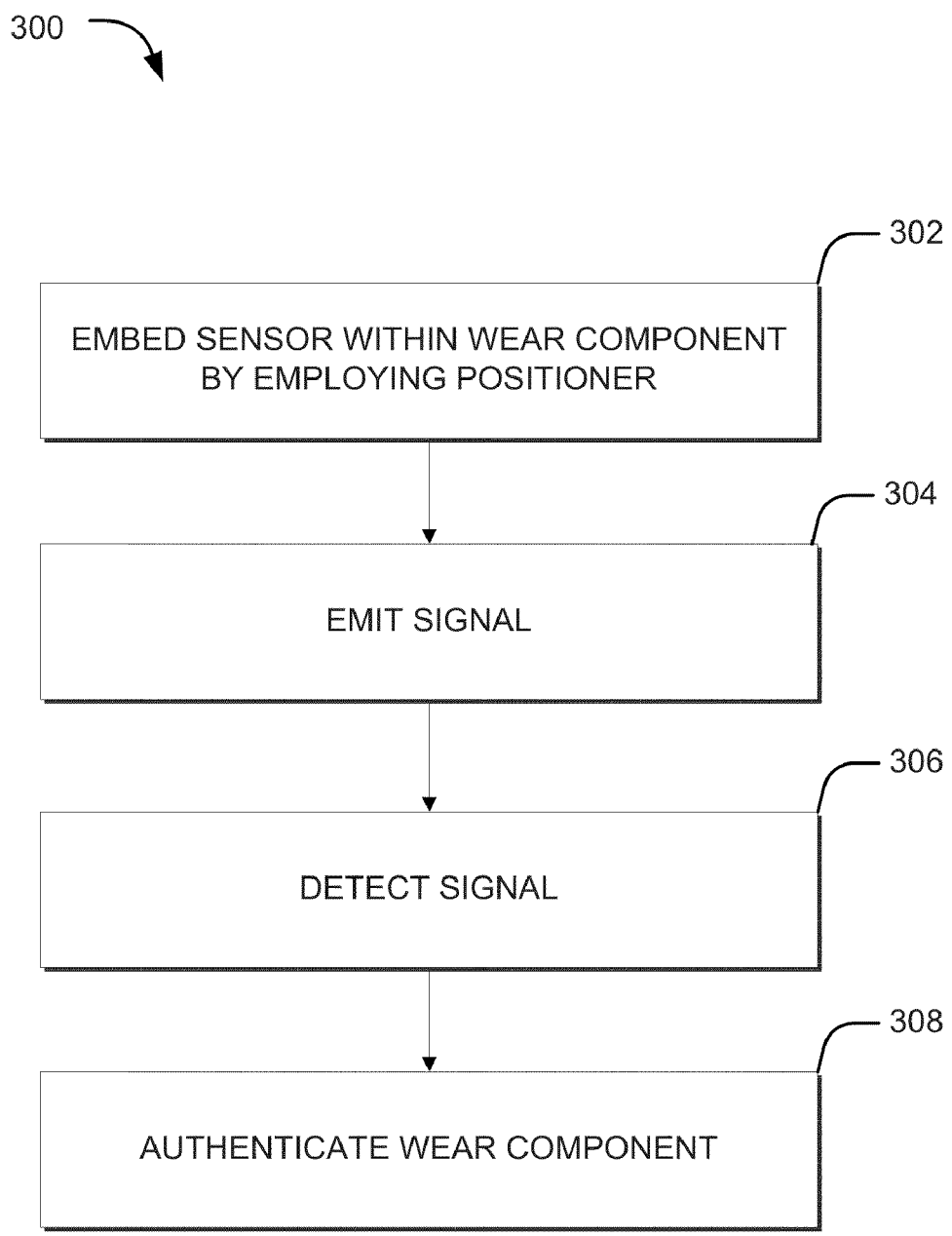
FIG. 3 illustrates a method for sensing condition of a wear component in a vehicle.

FIG. 3 illustrates a method 300 for sensing the condition of a wear component in a vehicle. The method 300 provides a sensor that may emit a variety of signals, at step 301. At step 302, the method 300 embeds the sensor within the wear component, employing a positioner. The sensor emits a signal at step 304, confirming its presence. In various embodiments, the sensor can be a single frequency transmitter, or it may further perform single message communication, making this design cost-effective as well as simple to implement. Further, at step 306, a detector in the vehicle detects the signal.

In certain embodiments, the sensor is an RFID tag. As already discussed in relation with FIG. 2, most vehicles already have RFID detectors that can read and detect RFID tags. Other vehicles have electronic detectors to monitor other parameters related to vehicle operation, such as tire pressure. Such detectors can also detect wireless signals that emanate from RFID tags. Many such detectors require only minor modifications to allow detection of RFID tags or other similar components. As long as the sensor is present in the wear component, the detector can ascertain the sensor's presence. In the event that the wear component wears to an extent that the embedded sensor is destroyed, the detector will cease to receive the signal from the sensor.

The precise position and design of the positioner ensure that the destruction of the sensor indicates the exact amount of wear sustained by the wear component and the time remaining until the wear component needs replacement or repair. In one implementation, the detector communicates with a driver display or message center that can update the driver on the status of various components, as already described in relation with FIG. 2. In case the sensor is destroyed, the driver display or message center can alert the driver that the wear component requires replacement or repair. At step 308, the method 300 authenticates the wear component based on an authentication signal emitted by the sensor, as described in relation with FIG. 2.

The wear component may be any component within a vehicle that experiences wear, such as a brake pad. In one embodiment, the positioner is a plug enclosing the sensor and may be manufactured from a plastic material. It will be appreciated by a person skilled in the art that the positioner may vary in shape, size, structure, material, or other characteristics, without departing from the scope of the present disclosure, as long as it serves the purpose of providing precise positioning of the sensor and facilitating its destruction in a predictable manner. In another embodiment, the method 300 includes molding the positioner, with the embedded sensor, into the wear component.

The embodiments described herein provide methods and devices for sensing wear of a component. The sensor provided within the wear component is low cost in its design, and its destruction indicates the extent of wear of the wear component. Furthermore, a positioner places the sensor in a predetermined position, allowing accurate wear condition assessment of the wear component.

While the best mode for carrying out the invention has been described in detail, those familiar with the art to which this invention relates will recognize various alternative designs and embodiments for practicing the invention as described by the claims.

What is claimed is:

1. A method for sensing the condition of a wear component comprising:
- providing a sensor, configured to emit signals, including an authentication signal;
- embedding the sensor within the wear component, employing a positioner within the wear component;
- enclosing the sensor within the positioner, wherein the positioner is a plug;
- detecting a signal from the sensor; and
- authenticating the wear component based on an authentication signal emitted by the sensor.

2. A method for sensing the condition of a wear component comprising:
- providing a sensor, configured to emit signals, including an authentication signal;
- embedding the sensor within the wear component by molding the sensor within the wear component, employing a position or within the wear component;
- enclosing the sensor within the positioner, wherein the positioner is a plug;
- detecting a signal from the sensor; and
- authenticating the wear component based on an authentication signal emitted by the sensor.

* * * * *